United States Patent [19]
Brooks

[11] Patent Number: 5,709,404
[45] Date of Patent: Jan. 20, 1998

[54] AIR BAG SYSTEM

[76] Inventor: Richard C. Brooks, P.O. Box 651, Merrimack, N.H. 03054

[21] Appl. No.: 579,867

[22] Filed: Dec. 28, 1995

[51] Int. Cl.$^6$ ................................................ B60R 21/22
[52] U.S. Cl. ..................... 280/735; 180/273; 340/667; 200/85 A
[58] Field of Search ........................ 280/734, 735; 180/273, 279, 290; 307/10.1; 364/424.055; 340/438, 667; 200/85 A

[56] References Cited

U.S. PATENT DOCUMENTS

| | | | |
|---|---|---|---|
| 3,807,343 | 4/1974 | Peebles | 180/273 X |
| 4,385,863 | 5/1983 | Minor | 180/273 X |
| 4,678,058 | 7/1987 | Wooters | 200/85 A |
| 5,481,078 | 1/1996 | Asche | 200/85 A |
| 5,612,876 | 3/1997 | Zeidler et al. | 364/424.055 |
| 5,624,132 | 4/1997 | Blackburn et al. | 280/735 |

OTHER PUBLICATIONS

Chilton Repair Manual, Saturn Coupe, Sedan & Wagon, 1991–1993, pp. 6–13.

*Primary Examiner*—Christopher P. Ellis
*Attorney, Agent, or Firm*—Chase & Yakimo

[57] ABSTRACT

An improved air bag system comprises a supplemental switch structure incorporated into the user's seat for delivering a current to the conventional air bag system irrespective of seat belt engagement. The structure includes an arcuate flexible band coupled to a horizontal band, the latter engaging a spring biased button of a switch. The switch is incorporated into the seat belt circuitry such that a current flows therethrough upon switch closure irrespective of seat belt engagement. The current flow to the air bag system places the air bag system in a ready mode so as to cause air bag inflation upon a sufficient impact of the vehicle bumper with another object.

14 Claims, 5 Drawing Sheets

AIR BAG SYSTEM

BACKGROUND OF THE INVENTION

This invention relates to an air bag system and, more particularly, to a supplemental arming structure for an air bag system which will either independently place the conventional air bag system into a ready mode or is incorporated into existing vehicle circuitry, e.g. the conventional seat belt system circuit found in today's vehicles.

The use of supplemental inflatable restraint systems, commonly called air bag safety systems, in automobiles is known. However, as presently understood, the air bag system in certain vehicles will not function unless the corresponding seat belt of the vehicle driver and/or passenger has been engaged. Absent seat belt engagement, no current is available from a circuit associated with the seat belt system. Absent this current, the arming device of the air bag system cannot place the air bag system in a ready mode. Absent this ready mode energization, the air bag will not inflate upon a sufficient vehicle bumper impact.

As known, an appreciable percentage of drivers and/or passengers do not wear seat belts. Thus, the presence of an air bag system in the vehicle, dependent upon seat belt usage, will have no effect. Some vehicles may have warning alarms, such as buzzers, lights and the like, which advise the driver and/or passenger that the seat belt is not fastened. However, such alarms normally deactivate after a preset period of time. It is also known that in some instances these alarms are disconnected by the user.

Accordingly, in response thereto I have devised an arming device for an air bag system which will deliver current to the air bag system so as to place the same in a ready mode irrespective of the engagement of the seat belt system. My device presents a specially-designed switch structure, positioned in the seat and incorporated into a conventional vehicle seat belt system circuit, which closes upon driver and/or passenger seating. Upon closure current is delivered to an arming sensor or initiator in the air bag system so as to place this system in a ready or standby mode. Accordingly, a sufficient impact on the front bumper of the vehicle will activate the system, inclusive of inflation of the air bag. My device enables an air bag system to function either with or without engagement of the seat belt system. Thus, in case of seat belt system failure, user forgetfulness or intentional deactivation of the seat belt system, at least the safety features of the air bag system will still be available to the driver and/or passenger.

Accordingly, it is a general object of this invention to provide an improved air bag system in a vehicle.

Another object of this invention is to provide a device, as aforesaid, which is placed into a ready mode by a seated driver and/or passenger.

Still another object of this invention is to provide a supplemental arming device for the air bag system, as aforesaid, which provides structure mounted within the seat proper which is responsive to user seating.

A further object of this invention is to provide an air bag system with device, as aforesaid, the supplemental arming device being made of a pair of flexible bands coupled to a switch inserted within an electrical circuit, the closure of the switch delivering current to the air bag system.

A particular object of this invention is to provide an air bag system, as aforesaid, which can either work independently or in connection with a seat belt circuit or other vehicle circuit.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
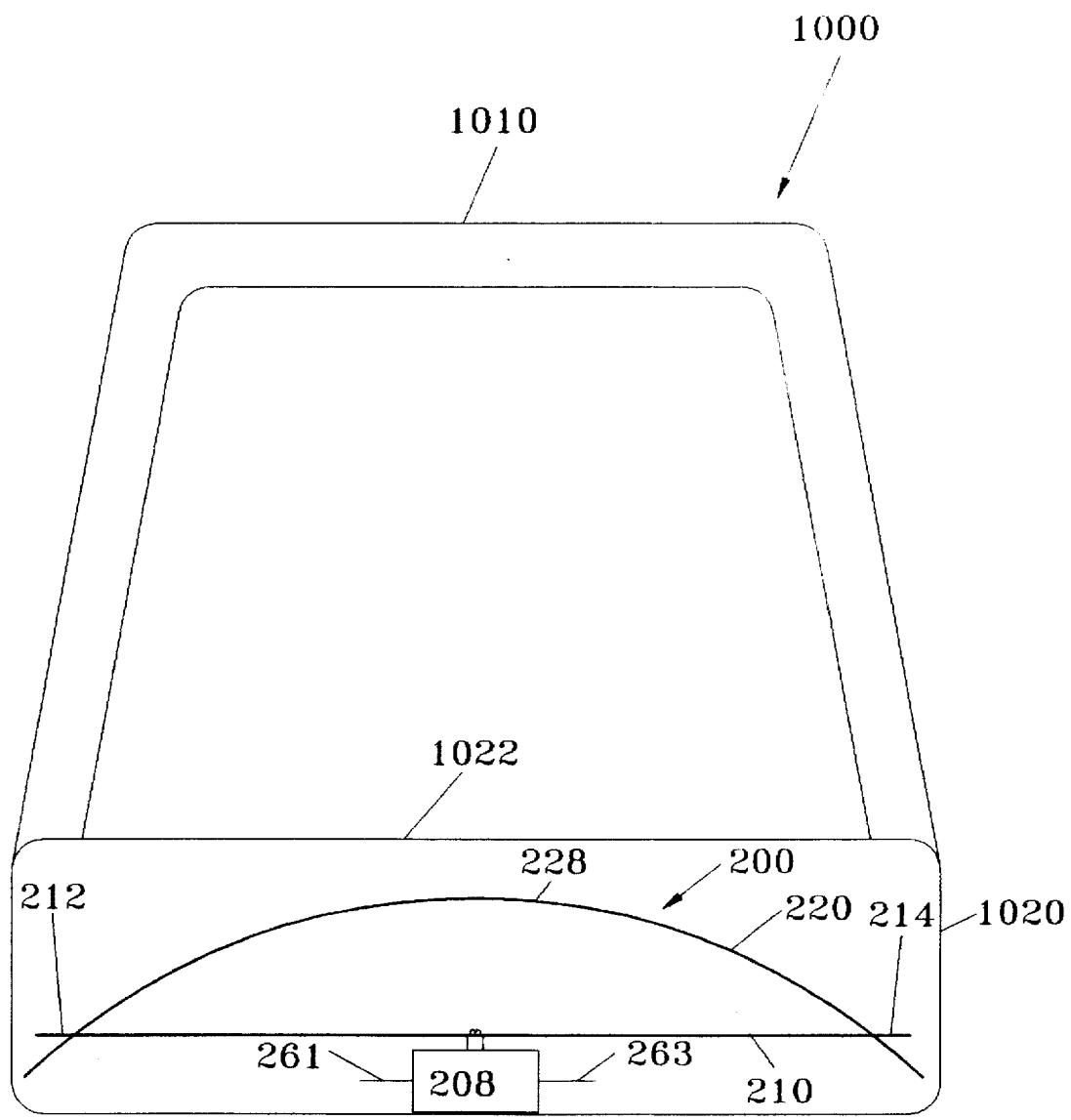
FIG. 1 is a front diagrammatic view of a vehicle seat showing the pressure responsive switch structure of the air bag system within the seat proper.

Turning more particularly to the drawings, FIG. 1 diagrammatically shows a driver or passenger seat 1000 of a vehicle, the seat comprising a vertical back rest 1010 and a horizontal seat 1020.

Figure 2:
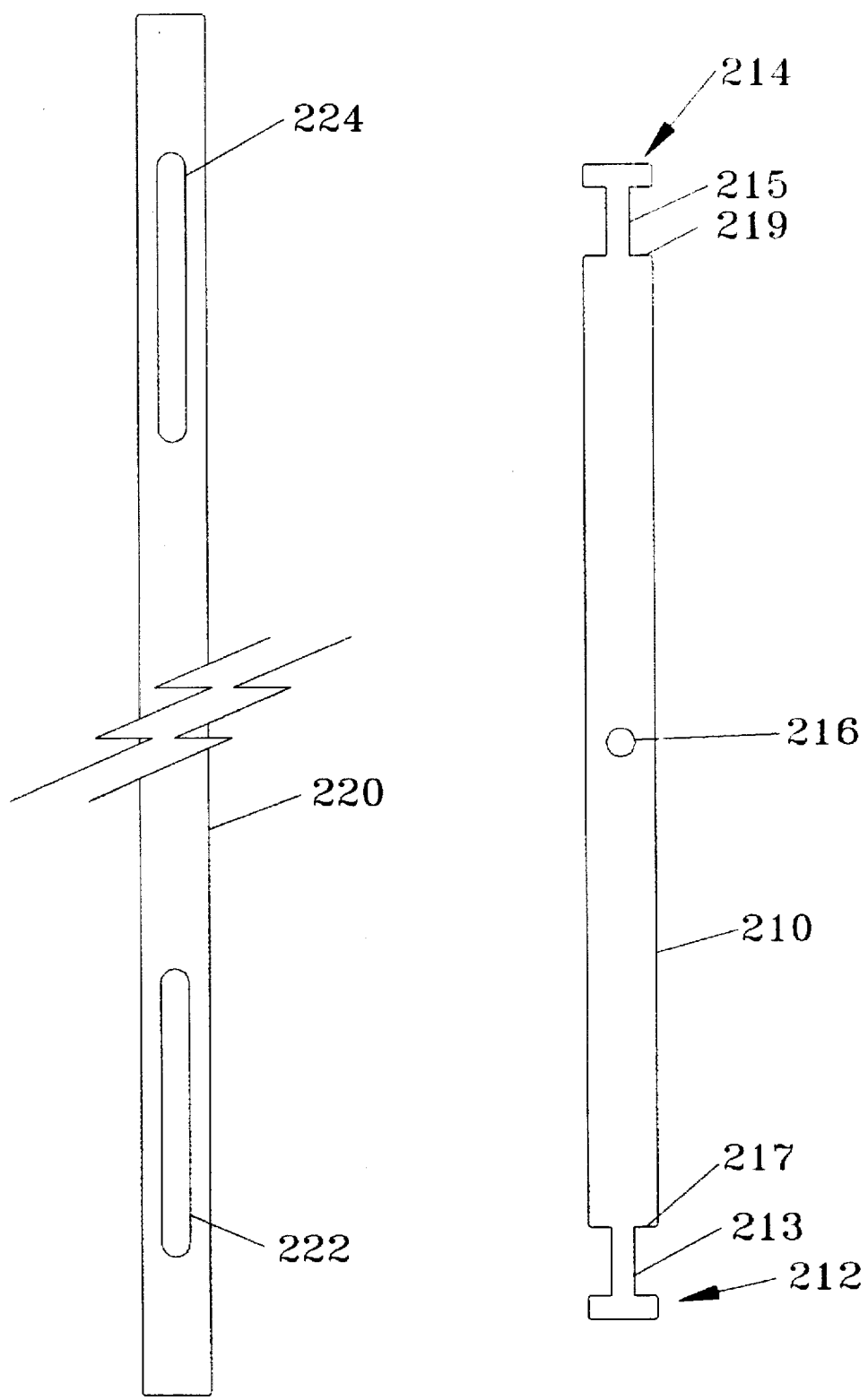
FIG. 2 is an elevation view showing the first and second flexible bands of the switch structure shown in the driver's seat of FIG. 1.
Figure 4:
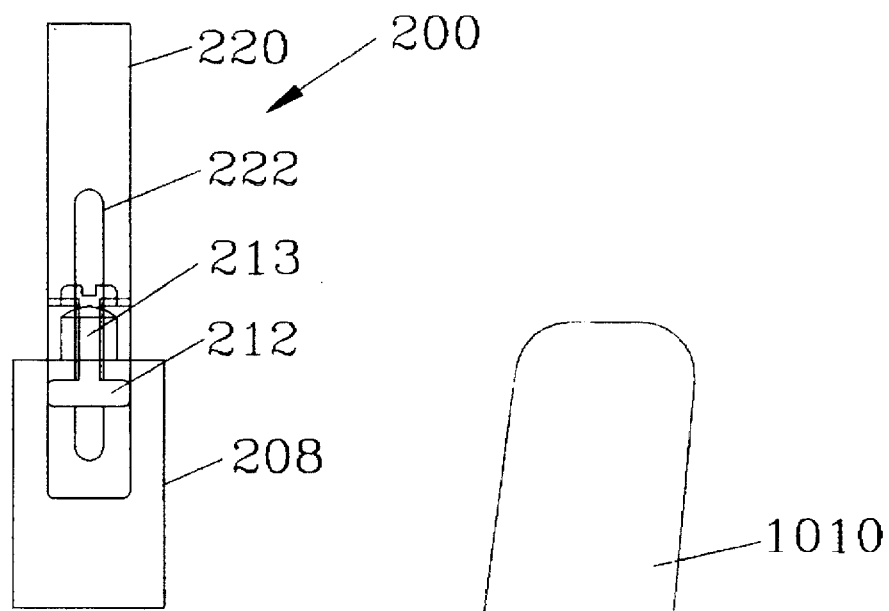
FIG. 4 is a side view of the pressure responsive structure of FIG. 3 on an enlarged scale.
Figure 3:
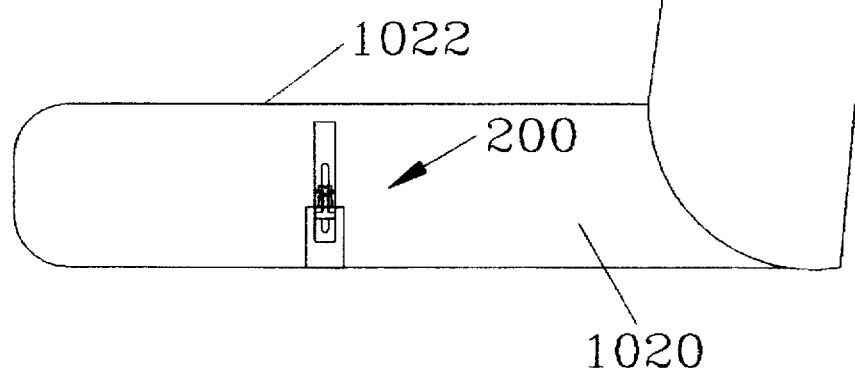
FIG. 3 is a diagrammatic side view of a vehicle seat showing the pressure responsive structure therein.

As further shown in FIG. 1, a supplemental arming device 200 in the form of a pressure responsive switch assembly 200 is positioned within the seat structure 1020. This device 200 generally comprises a switch 208 presenting a spring-biased button 209 which projects through aperture 216 in a first flexible, horizontal band 210. A second arc-shaped, flexible band 220 is coupled to band 210 and presents a midpoint 228 generally adjacent the top surface 1022 of seat structure 1020. As shown in FIG. 2, band 210 presents first and second opposed tab structures 212, 214 at the ends thereof which are inserted through slots 222, 224 of flexible band 220. This slot/tab structure allows the slots 222, 224 to slide along the shanks 213, 215 of tabs 212, 214. The bands 210, 220 preferably laterally extend across the seat 1020. As such, downward movement of band 220 causes the ends 217, 219 of the band 210 to bear against the ends of the slots 222, 224. This downward movement is transmitted to band 210 and the button 209 of switch 208 so as to close the switch 208.

Figure 5:
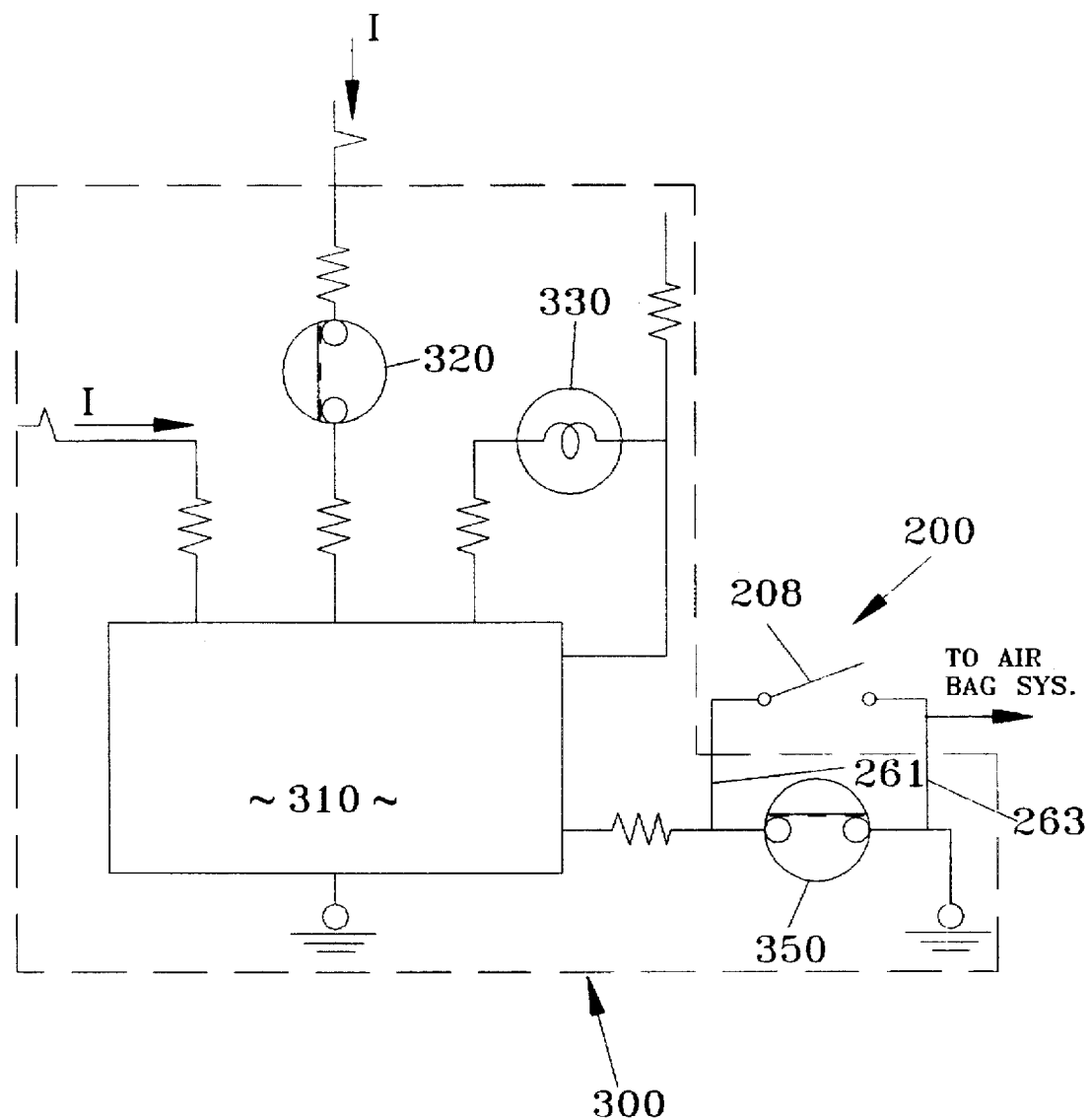
FIG. 5 is a schematic view showing one type of circuit utilized in a seat belt system.
Figure 6:
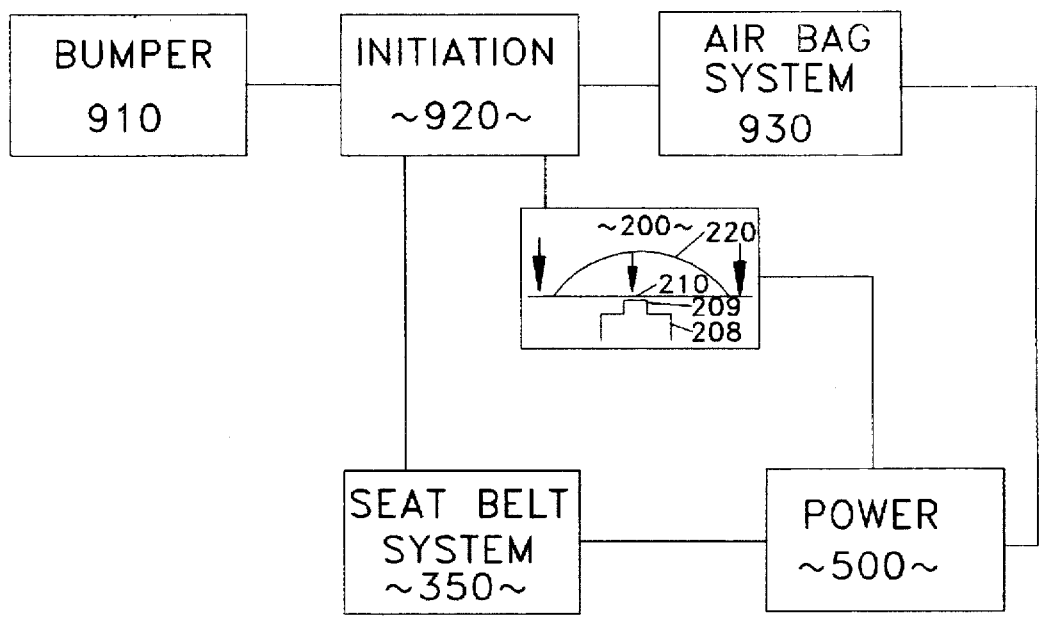
FIG. 6 is a general block diagram showing the relationship among the pressure responsive structure, seat belt and air bag systems.

One form of seat belt circuitry 300 is shown in FIG. 5, it being understood that the circuit is connected to the vehicle battery power 500 to provide a current flow therethrough. The circuit 300 includes a seat belt beeper/timer unit 310 wired to the key ignition 320. Upon turning on the ignition 320, current will flow to this unit 310 and through the alarm light 330 for a set period of time if the seat belt, as shown by switch 350, is not connected. If connected, the current will flow through seat belt switch 350 such that light 330 will not be energized.

Thus, the seat belt system is incorporated into the circuit 300 such that the circuit will be closed at 350 upon buckling of the seat belt. If closed, the flashing of the light alarm 330 will cease. It is understood that in some vehicles the alarm 330 will cease beeping and/or flashing after a certain amount of time as determined by the design of the internal timer 310. Thus, the light 330 will turn off irrespective of whether the seat belt is buckled.

My supplemental arming device 200 is wired 261, 263 in parallel into the circuit 300 such that it is not dependent upon closure of the seat belt switch mechanism 350 to receive current delivery thereto.

In use the driver or passenger first sits in the appropriate seat 1000. If the seat belt is not buckled the beeper will sound and/or the warning light 330 will flash for a certain period of time as determined by the timer 310 design. Of course, it is understood that the type of seat belt alarms may vary and in some cases the car will not be able to start unless the seat belt is first engaged. In any case, as shown in the drawings, the leads 261, 263 of switch 208 are wired into the circuit 300 such that current will flow through the parallel switch 208 upon closure. Switch closure is caused by a user sitting in the seat 1000 causing the upper arcuate band 220 to straighten. This action, due to the tab/slot relationship between bands 210, 220, depresses the lower band 210 and the spring biased button 209 which closes switch 208. Upon closure of the switch means 208 current will flow therethrough which in turn is routed to a downstream initiator 920 of the air bag system 900 so as to place the system 900 in its standby mode.

In the standby mode a sufficient collision on the bumper 910 of the vehicle will trigger the conventional air pressure cylinder in the air bag system 930 so as to inflate the air bag.

It is also noted that the switch assembly 200, as above described, can be inserted in other types of circuits associated with a seat. The switch assembly 200 can be used to close a circuit, the circuit indicating the presence of a seated user within the seat. Thus, the switch assembly 200 can be used in environments other than the air bag/seat belt systems.

Although the above device has been described as being incorporated into one type of seat belt system, it is also understood that my device may be utilized independent of a seat belt system. Thus, it is to be understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. In a vehicle air bag system having a first switch means therein responsive to a current flow for placing the air bag system in a standby mode upon buckling of a seat belt of an associated seat belt system, the seat belt system including an open circuit when the seat belt is disengaged and a closed circuit upon seat belt buckling, the current flow in the closed circuit delivered to the switch means of the air bag system, the improvement comprising:

a normally open second switch means in the circuit for delivering current to the air bag system means upon closure;

means connected to said second switch means and positioned within a vehicle seat for response to a user sitting on the seat, said responsive means closing said normally open second switch means connected thereto, said closed second switch means delivering current to said first switch means, whereby to place the air bag system in a ready mode.

2. The system as claimed in claim 1 wherein said second switch means comprises:

a switch for current flow therethrough;

a spring biased button in said switch with depression of said button closing said switch;

a first band positioned within said seat in contact with said button;

a second band positioned in said seat and coupled to said first band, whereupon downward movement of said second band depresses said first band and button, whereby to close said switch.

3. The system as claimed in claim 2 wherein said second band comprises:

a generally horizontal strip of flexible material;

first and second slots at opposed ends of said second band for receiving first and second ends of said first band therein.

4. The system as claimed in claim 3 wherein each of said first band ends comprises:

a shank;

a tab at an end of said shank, said tab extending through said corresponding slots of said second band, whereupon downward movement of said second band causes said slots to slide along said shanks and contact an end thereof.

5. The system as claimed in claim 4 wherein said second band is arcuate in configuration in a normal mode, whereupon the user sitting in the seat urges said second band in movement towards said first band, said movement urging said slot movement of said second band.

6. The system as claimed in claim 2 wherein said button of said switch extends through an aperture in said first band.

7. The system as claimed in claim 2 wherein said first and second bands laterally extend across a width of the seat.

8. For use with a current energized vehicle air bag system having current responsive means therein for placing the air bag system in a ready mode, the system including a normally open circuit, the improvement comprising:

a pressure responsive switch means within the circuit and positioned in a vehicle seat;

pressure responsive structure associated with the pressure responsive switch means within the selected vehicle seat and responsive to pressure of a user sitting thereon, said pressure responsive structure closing said switch means whereupon to close the circuit and place the air bag system in a ready mode.

9. The system as claimed in claim 8 wherein said second switch means comprises:

a switch for current flow therethrough;

a spring biased button in said switch with depression of said button closing said switch;

said pressure response structure comprising:

a first band positioned within said seat in contact with said button;

a second band positioned in said seat and coupled to said first band, whereupon downward movement of said second band depresses said first band and button, whereby to close said switch.

10. The system as claimed in claim 9 wherein said second band comprises:

a generally horizontal strip of flexible material;

first and second slots at opposed ends of said first band for receiving first and second ends of said second band therein.

11. The system as claimed in claim 10 wherein each of said first band ends comprises:

a shank;

a tab at an end of said shank, said tab extending through said corresponding slot of said second band, whereupon downward movement of said second band causes said slots to slide along said shanks and contact an end thereof.

12. The system as claimed in claim 11 wherein said second band is arcuate in configuration in a normal mode, whereupon the user sitting in the seat urges said second band in movement towards said first band, said movement urging said slot movement of said second band.

13. The system as claimed in claim 9 wherein said button of said switch extends through an aperture in said first band.

14. The system as claimed in claim 9 wherein said first and second bands laterally extend across a width of the seat.

* * * * *